United States Patent [19]

Brueckheimer

[11] Patent Number: 5,680,607
[45] Date of Patent: Oct. 21, 1997

[54] DATABASE MANAGEMENT

[75] Inventor: Simon Daniel Brueckheimer, London, United Kingdom

[73] Assignee: Northern Telecom Limited, Montreal, Canada

[21] Appl. No.: 650,660

[22] Filed: May 20, 1996

Related U.S. Application Data

[63] Continuation of Ser. No. 333,263, Nov. 2, 1994, abandoned.

[30] Foreign Application Priority Data

Nov. 4, 1993 [GB] United Kingdom .................. 9322748

[51] Int. Cl.$^6$ ..................................................... G06F 17/30
[52] U.S. Cl. ........................................... 395/607; 395/603
[58] Field of Search .................................. 395/607, 603, 395/606

[56] References Cited

U.S. PATENT DOCUMENTS

| | | | |
|---|---|---|---|
| 4,945,475 | 7/1990 | Bruffey et al. | 395/600 |
| 5,204,958 | 4/1993 | Cheng et al. | 395/600 |
| 5,218,696 | 6/1993 | Baird et al. | 395/600 |
| 5,257,365 | 10/1993 | Powers et al. | 395/600 |
| 5,325,290 | 6/1994 | Cauffman et al. | 364/401 |
| 5,440,734 | 8/1995 | Wagar | 395/607 |
| 5,490,269 | 2/1996 | Cohn et al. | 395/607 |

OTHER PUBLICATIONS

"Sort versus Index", by Mac Rubel, Data Based Advisor, v7, n2, p. 40(4) Feb. 1989.

"An Introduction to Indexed Files" by Ray Duncan, v8, n7, p. 291(6) Apr. 1989.

"Supercharging Sequential Searches; Speed plus compression equals faster searches" Walter Williams, Dr. Dobb's Journal, v15, n12, p. 54(7) Dec. 1990.

*Primary Examiner*—Thomas G. Black
*Assistant Examiner*—Hosain T. Alam
*Attorney, Agent, or Firm*—Lee, Mann, Smith, McWilliams, Sweeney & Ohlson

[57] ABSTRACT

A database contains listing records, and index records each providing a pointer to a listing record. The index records are stored, in a predetermined order, together with distributed free space to allow the future insertion of new index records. Each index record is provided with a radix sort key associated with a primary keyword in the corresponding listing record whereby that index record may be inserted in the correct order without reference to the listing record.

4 Claims, 5 Drawing Sheets

Fig.6.

| Key+Ext. | Primary | Alliterative | Header | Radix | Name |
|---|---|---|---|---|---|
| SMITHSO | | | | 100 | CRAIG-SMITHSON |
| SMIT | | | | 210 | EDWARDS-SMIT |
| SMITH | | | | 220 | EDWARDS-SMITH |
| SMITHER | | | | 400 | NATHAN-SMITHERS |
| SMITH | ✓ | | | 1000 | SMITH, A |
| SMITH | ✓ | | | 1010 | SMITH, E |
| SMITH | ✓ | | | 1020 | SMITH, M |
| SMITH | ✓ | | | 1030 | SMITH, T |
| SMITH | ✓ | | | 1040 | SMITH-COD |
| SMITH | ✓ | ✓ | | 1050 | SMITH-SMITHERS |
| SMITHER | | ✓ | | 1050 | SMITH-SMITHERS |
| SMITHSO | ✓ | ✓ | ✓ | 1060 | SMITHSON SMITH INC |
| SMITH | | ✓ | ✓ | 1060 | SMITHSON SMITH INC |
| SMITHSO | | ✓ | | 1060 | Building Supplies |
| SMITH | | ✓ | | 1060 | Building Supplies |
| SMITHSO | | ✓ | | 1060 | Stores |
| SMITH | | ✓ | | 1060 | Stores |
| SMITHSO | | ✓ | | 1060 | Purchasing |
| SMITH | | ✓ | | 1060 | Purchasing |
| SMITHY | ✓ | | | 1070 | SMITHY, W |
| SMITH | | | | 2000 | THOMAS-SMITH |
| SMIT | | | | 2400 | VOLK-SMIT |
| SMITHE | | | | 2560 | WEST-SMITHE |

DATABASE MANAGEMENT

This application is a continuation of application Ser. No. 333,263, filed Nov. 2, 1994 now abandoned.

This invention relates to the construction and management of databases and in particular to a system for database updating.

BACKGROUND OF THE INVENTION

A problem commonly experienced with large databases is that of updating with new or revised information. A specific example of a large database is that employed by British Telecom in the provision of their 'directory enquiries' service. That database contains details of telephone subscribers and is accessed by an operator to retrieve subscriber information in response to requests from users of the system. This database is of course not static. New telephone subscribers are connected to the system while others may be disconnected for a variety of reasons. Subscribers may change their address (and sometimes their telephone number). Also, in the case of business subscribers, changes of name are not unusual. There is thus a steady flow of new information which requires updating of the database. The sheer size of the database has made this updating a difficult problem. Using current techniques, a day's work of updates takes more than a day to enter. Fortunately the amount of work involved is not directly proportional to the number of entries and if enough changes are saved before the updating process is run, it is possible to keep up with the rate of changes albeit at a cost of being always out of date. In practice, the largest (London) segment of the database is updated once a fortnight while the other segments are updated once a week. The updating process is very hungry both in processor power and disc space and a significant percentage of the installed equipment is in fact devoted entirely to updating and is thus unavailable for operator searching.

The object of the present invention is to minimise or to overcome this disadvantage.

SUMMARY OF THE INVENTION

According to the invention there is provided a database arrangement incorporating index records stored in a predetermined order, and listing records, each index record providing a pointer to a said listing record, and wherein the index records are stored together with distributed free space whereby to permit the insertion of new index records, and wherein each index record is provided with a radix sort key associated with a primary keyword in the corresponding listing record whereby each new index record may be inserted in the correct order without reference to the listing record.

BRIEF DESCRIPTION OF THE DRAWINGS

An embodiment of the invention will now be described with reference to the accompanying drawings in which:

FIG. 6 illustrates the format of a group of index records.

DESCRIPTION OF PREFERRED EMBODIMENT

Figure 1:
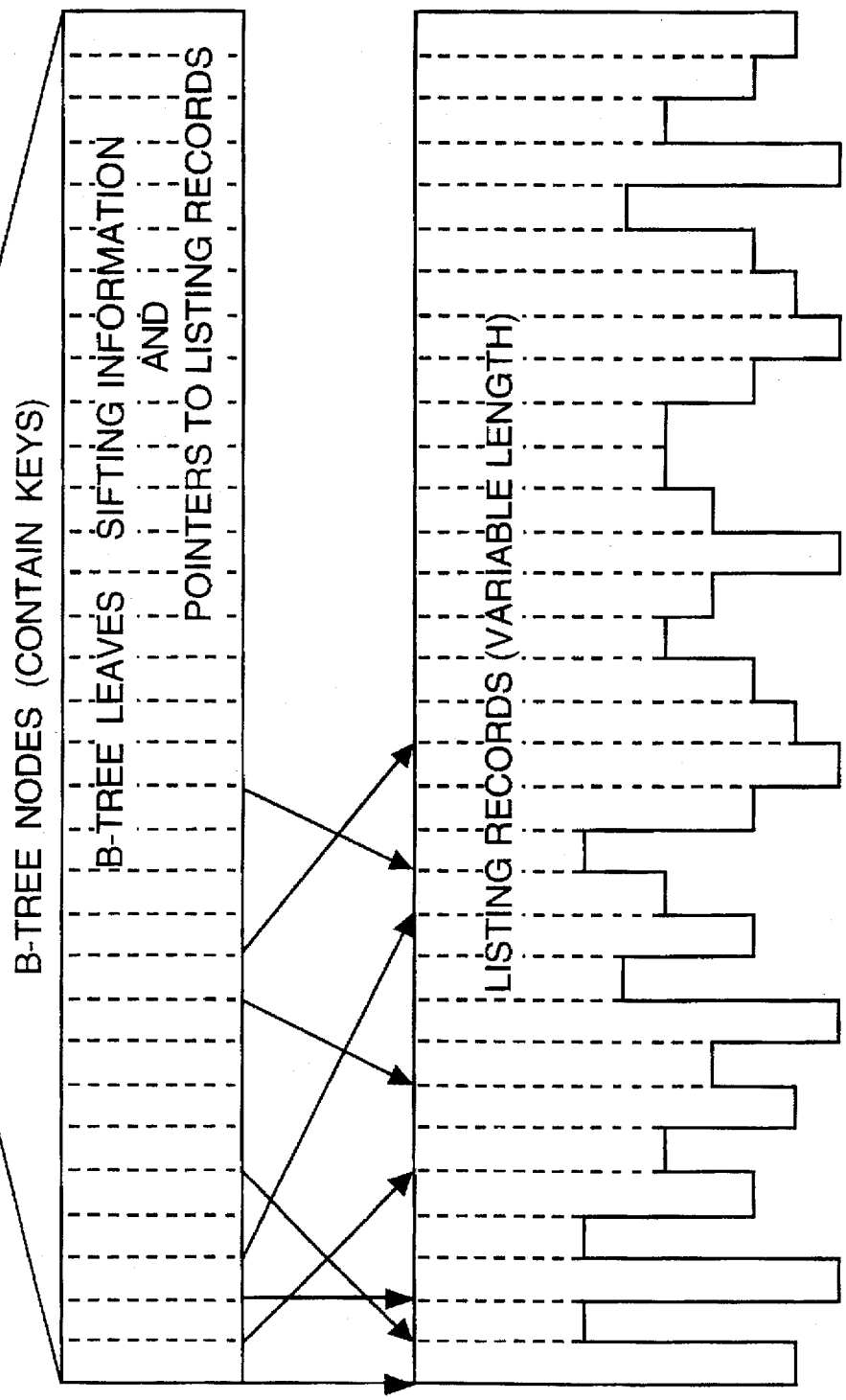
FIG. 1 is a schematic showing the structure of a conventional database storage arrangement.

Referring to FIG. 1, which is introduced for comparative purposes, this shows a conventional database storage arrangement which may e.g. comprise a listing of information relating to telephone subscribers. In the arrangement of FIG. 1, information is stored in the form of index records of equal length and arranged in a predetermined order, and listing records of variable length. Each index record provides a pointer to a listing record. In this arrangement one or more index records may point to the same listing record.

Updating of the database of FIG. 1 requires the insertion of new index records at the correct point. To effect this insertion it is necessary for the entire database to be re-ordered, re-indexed and re-written. As discussed above, this is costly both in terms of time and processor power.

Figure 2:
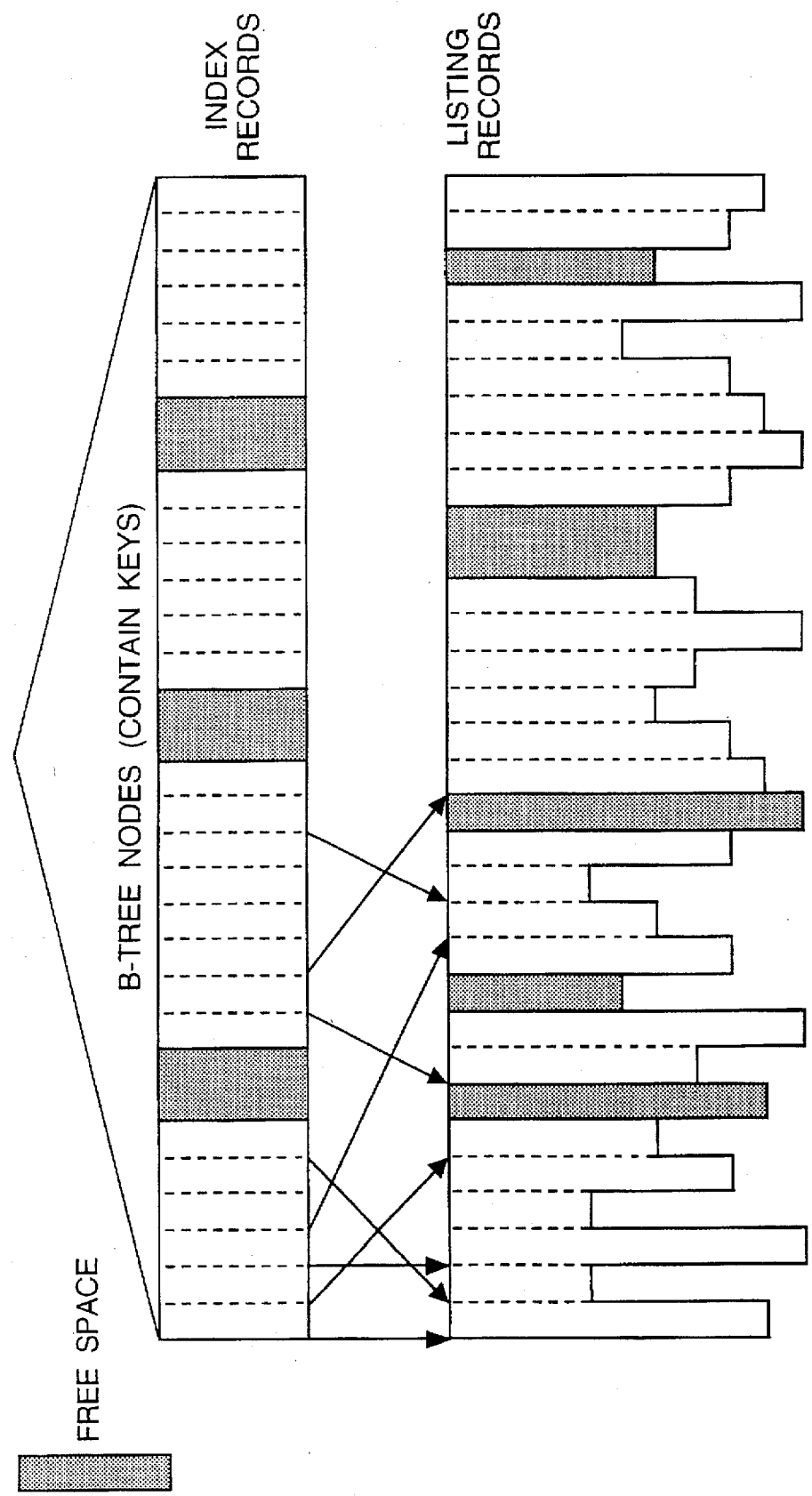
FIG. 2 is a schematic diagram of a database storage arrangement according to the invention.

Referring now to FIG. 2, this shows in highly schematic form a database storage arrangement according to the invention. As can be seen from FIG. 2, the index records and the listing records are stored each together with a number of empty spaces to allow for insertions. The number of spaces may be determined by the projected future expansion of the database. The index records are stored in display order as their relative position determined the order in which listing records are displayed.. When the database is first constructed the listing records are ordered, but these records will gradually become disordered as changes accumulate. This is not a problem as the ordered index records provide the necessary pointers.

Figure 3A:
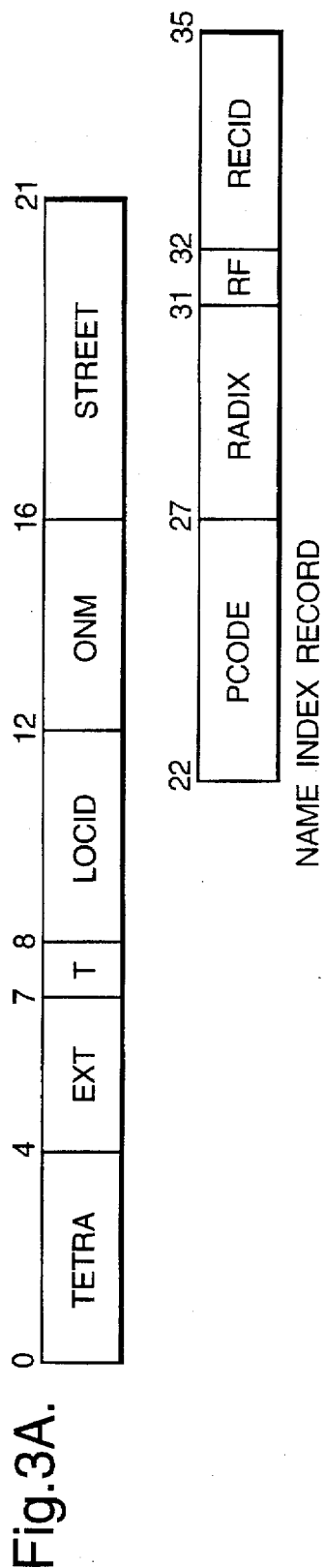
FIGS. 3a and 3b illustrate the structure of an index record in the database of FIG. 2 for a name index and a phonetic index respectively.
Figure 3B:
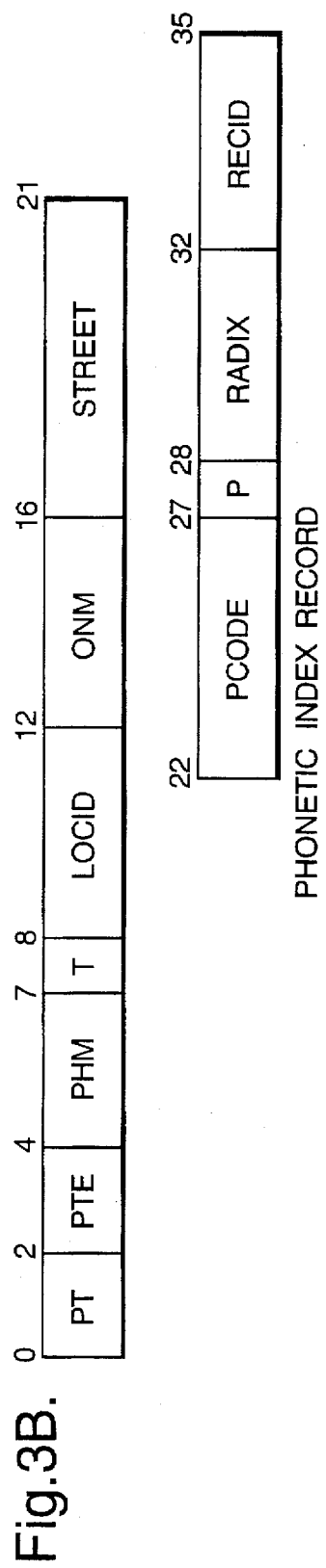

The format of index records in the database arrangement of FIG. 2 is illustrated in FIG. 3a which shows a name index record and FIG. 3b which shows a phonetic index record. The acronyms denoting the various parts of the index records are listed in Table 1 below.

TABLE 1

| ACRONYM | DESCRIPTION |
| --- | --- |
| TETRA | first four characters of the finding name |
| EXT | extension of TETRA, i.e. up to three characters of the finding name that may immediately follow the TETRA |
| PT | two characters forming the phonetic TETRA |
| PTE | two characters forming the phonetic TETRA extension |
| PHM | the phonetic mask |
| T | the record type |
| LOCID | location identifier |
| ONM | encoded other names mask |
| STREET | encoding of street information |
| PCODE | encoding of postcode information |
| P | padding byte |
| RADIX | four byte radix sort key to be described below |
| RF | one byte of radix flags, set to P = primary, A = alliteration, H = set (sub-)header |
| RECID | record identifier into the listings file |

The radix immediately precedes the RECID field unless the radix flag field is preset in the index record.

The RADIX element of the index record is a radix or numbering system that uses a common sod or prefix for associated numbers. Preferably the index is an extensible binary prefix. It is this radix which determines the insertion order of the new index record. In effect, the radix extends the ordinality property of numbers so that numerous insertions may be made between any other pair of radices to allow for updates. Radix insertions maintain the ordinality of the assigned values in a monotonically increasing order. To extend the range of assigned radices, significant binary digits are appended to the prefix. This extension may be made locally in the assigned range allowing for insertions at arbitrary points. In a preferred method, we compute the number of radices to be assigned when creating the index file. This range is distributed evenly across the entire index by adjusting the binary representation of the set of those numbers to the most significant bits of the used precision. The number n of binary digits required to represent the original prefix is chosen such that $$2^n \geq \text{the number of primaries} + 1$$

For example, if the used precision is one byte and the original number of primary indices is 7, then counting from 1, to allow insertion prior to the original range, the assigned radices are those listed below in Table 2.

TABLE 2

One byte Radix
001,00000
010,00000
011,00000
100,00000
101,00000
110,00000
111,00000

In Table 2 the prefix of each radix is indicated by a comma, and the trailing zeros provide the additional precision that allows insertions to effect in place updating. To create a new radix that lies between its nearest neighbours, the value is computed by a binary division of the sum of its immediate neighbour, i.e.

$$\text{new radix} = (\text{previous radix} + \text{following radix})/2$$

Figure 4:
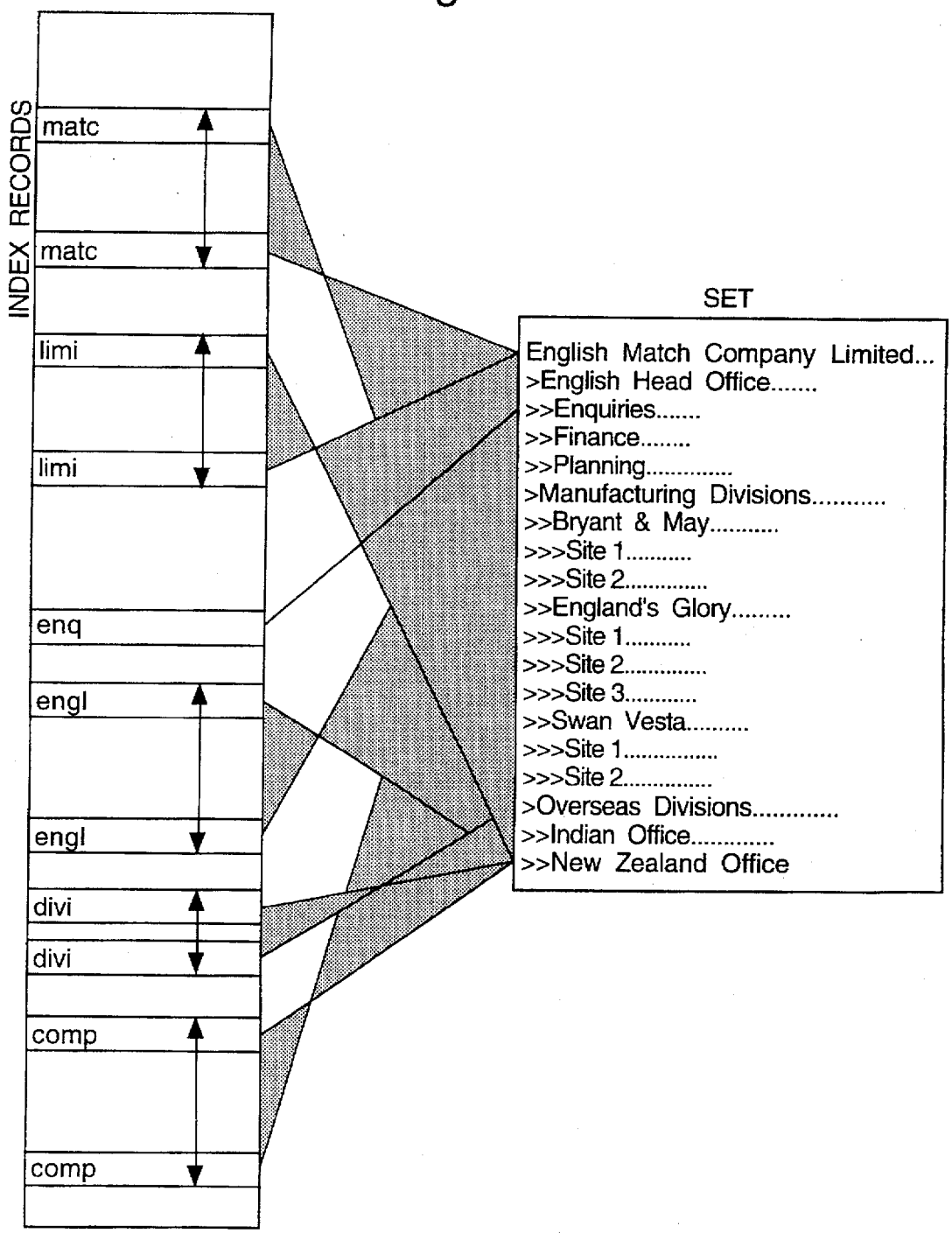
FIG. 4 illustrates the relationship between a set of listing records and corresponding index records in the database of FIG. 2.

Referring now to FIG. 4, this illustrates the relationship between listing records and index records. The listing records shown relate to a typical business subscriber (English Metal Company Limited) having a number of different offices/branches. These records are accessed via corresponding index records assigned to the primary and secondary keywords.

Updating the database of FIG. 2 requires the operation, delete and insert (a modification can be treated as a delete followed by an insert). Deletion is effected by loading the appropriate index and listing records by the normal search procedure and writing over them with a deleted indicator. The deleted records this provide further free space. To effect an insertion it is necessary to find the current place to insert a new index record in the index. This may be achieved by the following steps.

1. Create a new listing record and insert it into a free space.
2. Create a new index record that points to the listing record.
3. Assign a radix to the index record based on the position in display order of the index record generated for the listing record's primary keyword.
4. Inserting the index record at a position determined by its radix.

The insertion point of an index record containing a listing record's primary keyword (TETRA) is found by reference to the listing records. Once the index records insertion point has been found it is assigned a radix between the radices of the index records on either side of the insertion point. The same radix is then assigned to all the other (secondary keyword) index records generated by the listing. The secondary index records are inserted by reference to the radices in the existing index records without the need to consult the listing records.

When index sorting in the database of FIG. 2, allowance must be made for the presence of alliterated index records. The alliterative flag is set only for those indices that are alliterations of the primary search key TETRA. This occurs for alliterated keywords of an SL listing and for the members of caption sets when they inherit the primary second key of the set header. In addition they may have their own finding names that are also alliterated to the primary key. In all cases the index records have the same radix. The index with the primary radix flag is sorted first. The order of the non-primary but alliterative indices is not important within their own grouping and follows the normal sort number, but this grouping should be arranged to follow on contiguously from the primary index. The above primary-first sort order is determined by a comparison performed immediately after the TETRA and radix have been compared equal, but prior to any further field comparisons. This ensures, e.g. that indices for SMITHSON-SMITH sorts the primary SMITHSON before the alliteration SMITH.

The records of the index files are sorted into a key and display order. The key is essentially the name or phonetic TETRA, that ensures all records with the same TETRA are grouped together in the index file, and those groups are sorted essentially into alphabetical order. Within any TETRA group, the index records are sorted into display order. Display order is determined by the contents of selected fields in the original listing records, and sort rules that may be applied to those fields.

Figure 5:
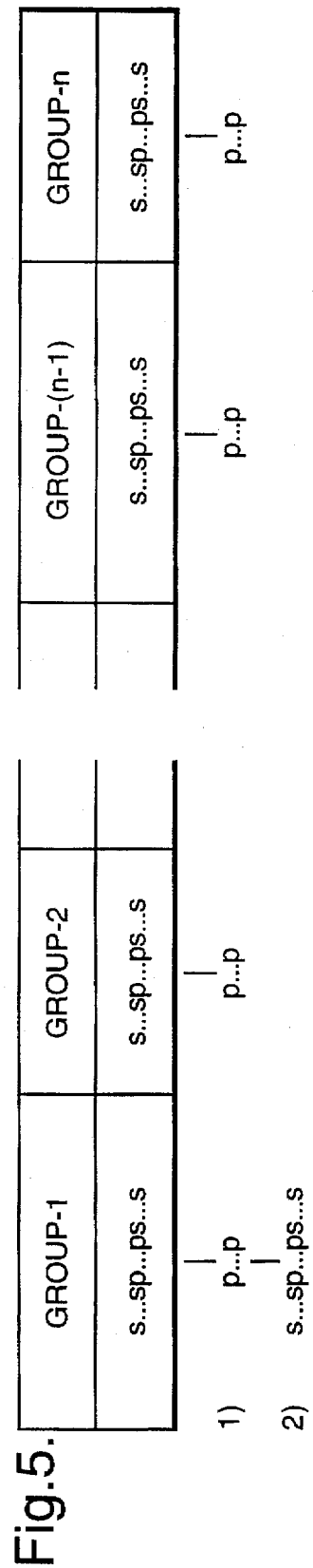
FIG. 5 illustrates the file layout in the database of FIG. 2.

Because of the ordering by key, the display order, and the uniqueness of the primary indices, the primary indices in the entire index file, i.e. belonging to all TETRA groups, are also in display order. The primary indices in each group are contiguous—bar alliterations—but may be preceded or followed by the secondary indices of listings with primary indices in preceding or following TETRA groups respectively. The overall file layout is illustrated schematically in FIG. 5 of the accompanying drawings wherein:

group-x—represents all index records with same TETRA key
p—represents primary (and possible alliterations—not shown) index
s—represents secondary index and the selection of indices in rows 1 and 2 are both in display order.

An example of a TETRA key group of index records, for the TETRA "suit", showing the primary, alliterative and header markings and typical radix values is shown in FIG. 6 of the drawings. Referring to FIG. 6, the group begins with secondary indices which are associated with primary indices from earlier key groups. Hence they have low radix values. Note that the secondaries have no special markings. The next section of the group is the primary indices, for names of whose primary search key is the TETRA of the group, and they are marked as primaries. Generally, these indices will be sorted in the display order, and the TETRA and extension will follow that pattern. However, the pattern of the TETRA and extension can be broken by alliterations, although display order is maintained. The alliteration "SMITH-SMITHERS" shows that the first index is marked as a primary and an alliteration. It is immediately followed by its alliterative secondary index, which has the same Radix, 1050, and therefore sorts adjacent to it, but the primary must come first. Thus a literal search for 'SMITH' or 'SMITH-ERS' will extract the listing once in the correct display order.

A particular example is the set 'SMITHSON SMITH INC', which is alliterative, and the primary should follow alphabetically the alliterative secondary. However the primary is placed first. Moreover, each member is shown twice, since it inherits both alliterative keywords from the set header. The member indices are marked alliterative because they appear in the primary insertion point of the set, not just because the keywords of the set header are alliterative. All the indices of the set have the same radish. Those indices that refer to headers are marked as such only where they inherit the primary search key. The group ends with secondary indices which are associated with primary indices from later key groups. Since radices are assigned to primary indices which are maintained in display order, the radix determines display order for the secondary indices, and therefore further sort information is not required to locate the position of these indices.

The database arrangement of FIG. 2 is built up by the following sequence.

The Index files are built in three stages. These separate stages are desirable because of constraints on memory, for efficiency, and compatibility with existing software and the logical sequence of the algorithm. The first stage, wp_ixsort, repeatedly does the following until the listings are exhausted; builds all the indices for each listing record, sorts the indices for (1000) listings in memory, and writes out that 'sorted run' into a temporary database file. O(1000) sorted runs are produced from each listings file. The name and phonetic temporary files for business or residential listings are built together at this stage.

The second stage, wp_ixradgen, is based on a merged sort process, that takes as input the sorted runs of names indices of the first stage, and generates a table. This table contains an entry for each primary index: a listing record produces one index record that is termed the primary index, because it is an index for the primary search keyword, i.e. the first word of a surname or business name for that listing. Any other index records generated by that listing are termed secondary indices and are built from subsequent keywords. The second stage determines the display order of the primary indices for names, and records the information in the table.

The third stage, wp_ixmerge performs the full merged sort on the sorted runs, and writes the index records into an index file. This stage uses the table from the second stage to generate and assign radices to both primary and secondary indices as they are written. The temporary file and table may be discarded after this stage.

To create the full complement of database index files, the first and second stage are run twice, once for business and once for residential listings. The third stage is run four times, once for each of the database index files; name and phonetic for both residential and business.

The radix sort key is introduced into the index record by enhancing the index build programs, as described below.

The first stage of index build is the wp_ixsort process. Wp_ixsort produces the sorted runs of indices and writes them to a temporary database.

During wp-ixsort, for each straight line, SLU header or caption set header record processed, a unique number is generated, a radix index. The same number is given to each index record associated with that listing record, both name and phonetic, and in the case of caption set headers, its constituent members' indices. The radix index may be a simple incrementing count, assigned in the order of arrival of the listings, and placed in the radix field to be overwritten by the later stage of radix generation. The primary and any alliterative and header indices will be marked as described earlier.

On completion, wp_ixsort creates a set of sorted runs of index records, where within each run :the index records were sorted in display order, and each primary index record would contain a unique radix index. As an example, if we had processed the following listing records in order:

TABLE 3

| Listing Name | Order of arrival |
| --- | --- |
| Cox, D | 1 |
| Cox, A | 2 |
| Cox-Smith, B | 3 |
| Smith-Cox, A | 4 |
| Smith, A | 5 |
| Smith, C | 6 |
| Smithson, J | 7 | this would produce for the first and second names:

TABLE 4

| (Run 1) | | | |
| --- | --- | --- | --- |
| Key + ext | Flag | Radix | Name |
| Cox | P | 2 | Cox, A |
| Cox | P | 1 | Cox, D |
| Cox | P | 3 | Cox-Smith, B |
| Smith | — | 3 | Cox-Smith, B |

TABLE 5

| (Run 2) | | | |
| --- | --- | --- | --- |
| Key + ext | Flag | Radix | Name |
| Cox | — | 4 | Smith-Cox, A |
| Smith | P | 5 | Smith, A |
| Smith | P | 6 | Smith, C |
| Smith | P | 4 | Smith-Cox, A |
| Smithso | P | 7 | Smithson, J |

In order to generate the radix sort key, a process wp_ixradgen is inserted prior to running wp_ixmerge. This process, wp-ixradgen, performs a merged sort of the sorted runs to deduce the display order of the primary indices as they would appear when the name index file is completed. The process creates a table, indexed by the radix index assigned by wp_ixsort, to map these primary indices into their true ordinal position. Hence, all the runs are scanned simultaneously to assess the merged order, and each time a primary index is encountered, its ordinal position is placed in the table against the radish index that primary contains Thus for the example above we have:

TABLE 6

| Radix Index | Ordinal Position |
| --- | --- |
| 1 | 2 |
| 2 | 1 |
| 3 | 3 |
| 4 | 6 |
| 5 | 4 |
| 6 | 5 |
| 7 | 7 |

This table is written into the temporary database for use by the next stage of the process.

The final stage in the generation of the radix sort key is to run an enhanced wp_ixmerge process, which produces the final sorted index files, replacing each radix index number with its associated radix from the table produced by wp_ixradgen.

By reading the entire mapping table, the number of entries and hence the range of radices may be assessed. The ordinal position in the table may then be normalised into a radix by the process described in the section on radices. The generated radix would then overwrite the radix index in the index records before they are put in the index file. The radix index mapping table may be used to generate the same radices for the name and phonetic index files. The final name index file is shown in the following table for the example described above with a radix of single byte precision:

TABLE 7

| Key + ext | Flag | Radix | Name |
|---|---|---|---|
| Cox | P | 00100000 | Cox, A |
| Cox | P | 01000000 | Cox, D |
| Cox | P | 01100000 | Cox-Smith, B |
| Cox | — | 11000000 | Smith-Cox, A |
| Smith | — | 01100000 | Cox-Smith, B |
| Smith | P | 10000000 | Smith, A |
| Smith | P | 10100000 | Smith, C |
| Smith | P | 11000000 | Smith-Cox, A |
| Smithso | P | 11100000 | Smithson, J |

We claim:

1. A method of storing in a database information relating to telephone subscribers comprising a plurality of listing records and associated index records said index records being ordered in predetermined ordinal sequence, the method comprising storing each said listing record in a respective location in the database, providing for each said listing record a corresponding index record, said index record incorporating a pointer identifying the location of the respective listing record, determining the position of that index record in the ordinal sequence of index records, assigning to said index record a radix code identifying for that index record its position in the ordinal sequence of index records, and storing said index records in said ordinal sequence, wherein each said radix code comprises a binary code having first and second parts, wherein said first part is an extensible prefix whose binary value provides an initial ordering of the respective index record, wherein said second pad is a binary digit string defining the precise ordinal position of the respective index record, and wherein the radix of a new index record is determined as the average value of the radices of the index records immediately preceding and immediately following that index record in the ordinal sequence.

2. A method as claimed in claim 1, wherein said listing records are of variable length.

3. A method as claimed in claim 1, wherein a plurality of index records are provided with pointers to one listing record.

4. A method as claimed in claim 3, wherein said one listing record incorporates primary and secondary keywords, and wherein said plurality of index records are assigned one to each said keyword.

* * * * *